United States Patent [19]

Segel

[11] 4,378,392

[45] Mar. 29, 1983

[54] LAMINATE TO EXTEND THE LIFE OF PHOTOGRAPHS

[76] Inventor: Joseph M. Segel, 614 Zollinger Way, Merion, Pa. 19062

[21] Appl. No.: 325,877

[22] Filed: Nov. 30, 1981

Related U.S. Application Data

[63] Continuation-in-part of Ser. No. 221,476, Dec. 30, 1980, abandoned, and a continuation-in-part of Ser. No. 271,320, Jun. 8, 1981, abandoned, which is a continuation-in-part of Ser. No. 221,476, Dec. 30, 1980, abandoned.

[51] Int. Cl.³ .................. B32B 7/06; B32B 3/18; B32B 7/02
[52] U.S. Cl. .................. 428/40; 156/249; 430/11; 430/14; 428/201; 428/204; 428/214; 428/215; 428/343; 428/352; 428/354; 428/355; 428/421; 428/480; 428/483; 428/515; 428/520; 428/522
[58] Field of Search .............. 430/8, 11, 14; 156/249; 40/2.2; 428/480, 483, 215, 247, 448, 451, 421, 343, 352, 354, 202, 201, 204, 515, 520, 522, 40, 214, 355

[56] References Cited

U.S. PATENT DOCUMENTS

| | | | |
|---|---|---|---|
| 2,578,282 | 12/1951 | Bliss | 430/14 |
| 2,632,701 | 3/1953 | Salminen et al. | |
| 3,028,252 | 4/1962 | Mones et al. | 252/589 X |
| 3,079,837 | 3/1963 | Theilemann | 430/11 X |
| 3,190,197 | 6/1965 | Pinder | |
| 3,388,661 | 6/1968 | Decof | 101/369 |
| 3,397,980 | 8/1968 | Stone | 430/8 |
| 3,417,497 | 12/1968 | Hannon | 40/2.2 |
| 3,460,961 | 8/1969 | Young et al. | |
| 3,473,929 | 10/1969 | Jeffreys et al. | |
| 3,506,470 | 4/1970 | Young et al. | 430/14 |
| 3,647,442 | 2/1972 | Malster | 40/2.2 |
| 3,931,431 | 1/1976 | Giorgi | 428/201 |
| 4,049,861 | 9/1977 | Nozari | 428/336 X |
| 4,064,314 | 12/1977 | McKenzie | 428/483 |
| 4,064,645 | 12/1977 | Wood | 40/159 |
| 4,077,830 | 3/1978 | Fulwiler | 156/249 |
| 4,156,046 | 5/1979 | Lien et al. | 428/336 X |
| 4,183,554 | 1/1980 | Howard, Jr. | 40/2.2 |
| 4,211,809 | 7/1980 | Barta | 428/202 X |
| 4,242,414 | 12/1980 | McKenzie | 428/483 X |
| 4,275,099 | 6/1981 | Dani | 428/480 X |

Primary Examiner—Thomas J. Herbert, Jr.
Attorney, Agent, or Firm—Seidel, Gonda, Goldhammer & Panitch

[57] ABSTRACT

A laminate to extend the life of photographs and prevent them from gradual deterioration due to environmental conditions comprises a laminate made of a transparent film of ultraviolet-stabilized polyethylene terephthalate or ultraviolet-stabilized acrylonitrile and a transparent silicone or acrylic adhesive bonded to the film, the laminate being adapted to be bonded to the image surface of a photograph by the adhesive. Alternatively, to provide even greater protection against moisture vapor and oxidation, an additional layer of a transparent fluorocarbon polymer may be bonded to the ultraviolet-stabilized polyethylene terephthalate or ultraviolet-stabilized acrylonitrile with a silicone or acrylic adhesive. Alternately, to provide a better aesthetic appearance by means of thermal texturization, an ultraviolet-absorbing polymethylmethacrylate film may be bonded to the ultraviolet-stabilized polyethylene terephthalate or ultraviolet-stabilized acrylonitrile with a silicone or acrylic adhesive. Any of these combinations is effective to protect photographs over a long period of time from elements which cause fading and degradation, such as ultraviolet radiation, cycling relative humidity, atmospheric pollution and oxidation.

20 Claims, 6 Drawing Figures

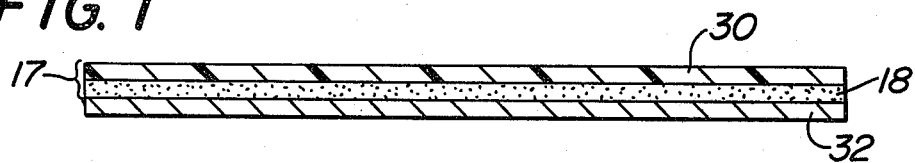
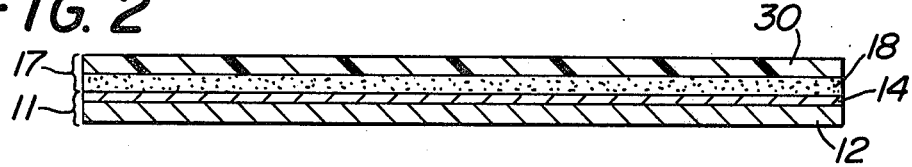
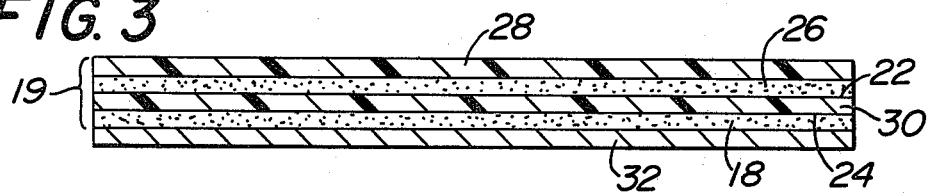
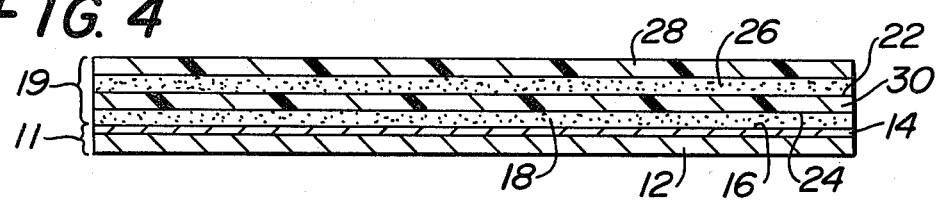
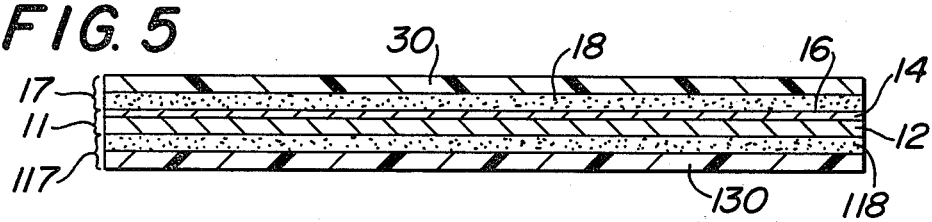
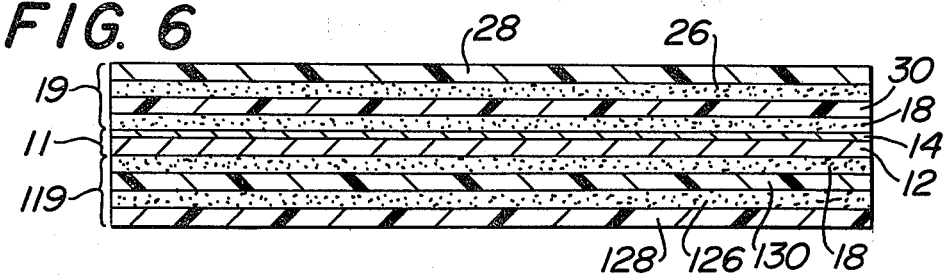

LAMINATE TO EXTEND THE LIFE OF PHOTOGRAPHS

CROSS-REFERENCE TO RELATED APPLICATIONS

This application is a continuation-in-part of both of applicant's co-pending U.S. patent applications Ser. No. 221,476, filed Dec. 30, 1980, now abandoned, and Ser. No. 271,320, filed June 8, 1981, now abandoned. The latter application, in turn, is a continuation-in-part of the former application.

BACKGROUND OF THE INVENTION

This invention relates to a novel laminating film which is effective in extending the life of photographic prints, especially those displaying color images. Although the specific embodiments described hereinafter relate to the protection of photographic prints, the invention may also be used to extend the life of graphics, documents, and other like objects which are subject to gradual deterioration, particularly due to fading.

The fading of photographic prints, especially color photographs made with chromogenic dyes, is a slow but continuously progressive process principally caused by ultraviolet radiation, cycling relative humidity, high temperature, atmospheric pollution and oxidation. Because the fading process progresses slowly over a period of years, the eye tends to adjust to such gradual changes, and the fading is not usually noticed until substantial deterioration has occurred and the condition has become irreversible.

By the use of the present invention, the fading process is greatly deterred over a period of time long enough to enable photographic color prints to be used for archival purposes.

There have been several attempted solutions to the problem of photographic print deterioration, but the common shortcoming of the prior art is that the protective materials specified are likely to themselves deteriorate within a period of time substantially shorter than that required for archival life.

U.S. Pat. No. 2,578,282 of Bliss, issued Dec. 11, 1951, discloses a laminate for application of a photographic element which is not subject to spectral reflection of light from the laminate. The laminate comprises the following layers: gelatin, gelatin and cellulose nitrate, cellulose acetate, and a surface layer of cellulose acetate and pigment. Such a laminate can be expected to give short-term protection against humidity and abrasion. However, the materials specified are not known to filter out ultraviolet radiation and are themselves susceptible to degradation in a period substantially shorter than that required for archival life.

U.S. Pat. No. 3,397,980 of Stone, issued Aug. 20, 1968, discloses a protective laminate for photographic film having micro-images formed thereon. The laminate comprises a durable outer layer, such as polyethylene terephthalate (Du Pont's Type D MYLAR) and an inner layer of polyethylene. The laminate is bonded to the photographic film by a polyvinyl acetate binder which bonds to both the emulsion coating of the photographic film and the polyethylene. Unless the polyethylene terephthalate contains an ultraviolet absorber, not contemplated by this patent, the photograh will not be protected from excessive ultraviolet radiation exposure. Moreover, the polyethylene layer of the laminate, as well as the polyvinyl acetate binder, are both subject to relatively rapid photodegradation. Thus, while the laminate disclosed in this patent can provide protection of the photographic film against humidity and abrasion, it will not impart archival qualities to a photograph that is exposed to normal room lighting over a period of years.

U.S. Pat. No. 4,077,830 to Fulwiler, issued Mar. 7, 1978, discloses another type of laminate used as a protective sheet over the emulsion surface of a photograph. The laminate is characterized by a pressure sensitive adhesive with a very smooth surface to avoid optical distortions. The laminate comprises a protective sheet not more than 0.001 inch thick, preferably formed of Du Pont's MYLAR polymer, and a coating of an adhesive, preferably an acrylic adhesive less than 0.001 inch thick. The patent specifically states that the adhesive transmits, rather than filters out, a major portion of ultraviolet light. Since ultraviolet light is a major cause of photographic fading, the laminate of this patent cannot be expected to inhibit fading, although it can be expected to provide a certain amount of protection against humidity and abrasion.

In addition to laminates of the type disclosed in the foregoing patents, there are various types of coatings in liquid form that have been applied to photographs and the like to provide varying degrees of protection. However, such coatings are difficult to apply uniformly, particularly without a precision coating machine, and liquid coatings do not provide as effective a barrier to humidity and atmospheric pollution as does a solid polymeric film. Examples of such coatings are disclosed in U.S. Pat. No. 2,632,701 of Salminen et al., issued Mar. 24, 1953, U.S. Pat. No. 3,028,252 to Mones et al., issued Apr. 3, 1962, U.S. Pat. No. 3,079,837 to Theilemann, issued Mar. 5, 1963, U.S. Pat. No. 3,190,197 of Pinder, issued June 22, 1965, U.S. Pat. No. 3,460,961 of Young et al., issued Aug. 12, 1969, U.S. Pat. No. 3,473,929 of Jeffreys et al., issued Oct. 21, 1969, U.S. Pat. No. 3,931,431 of Giorgi, issued Jan. 6, 1976, U.S. Pat. No. 4,049,861 of Nozari, issued Sept. 20, 1977, and U.S. Pat. No. 4,156,046 of Lien et al, issued May 22, 1979.

U.S. Pat. No. 3,506,470 of Young et al., issued Apr. 14, 1970, discloses photoprints coated with compositions which have an outer surface that rearranges under the influence of ultraviolet light to protect the photoprints from the effects of the ultraviolet light. The composition is disclosed as being applied in the form of solutions or in the form of free films cast from the solutions. The compositions disclosed in this patent are quite different from the materials used in the laminate of the present invention.

The present invention overcomes the principal problems associated with the prior art protective laminates and coatings. The laminates of the present invention provide an effective barrier against all of the known causes of photographic deterioration except temperature and, most significantly, are designed to provide that protection for substantially longer periods of time than the prior art.

SUMMARY OF THE INVENTION

The essence of the present invention is the construction of a laminate comprising components which themselves do not significantly degrade or deteriorate in conditions associated with the storage and indoor exhibition of photographs over a period of time adequate for archival purposes. In addition, the materials used in the laminate will provide a superior barrier to moisture vapor absorption, atmospheric pollution, ultraviolet light and oxidation.

The present invention comprises a laminate made of a transparent film selected from the group consisting of ultraviolet-stabilized polyethylene terephthalate and ultraviolet-stabilized acrylonitrile, and a layer of transparent adhesive bonded to the film, the adhesive being selected from the group consisting of silicone adhesive and acrylic adhesive, the laminate being adapted to be bonded to the image surface of a photograph by the adhesive.

Another embodiment of the invention comprises a laminate comprising a first transparent film selected from the group consisting of fluorocarbon polymer and ultraviolet-absorbing polymethylmethacrylate, a second transparent film selected from the group consisting of, ultraviolet-stabilized polyethylene terephthalate or ultraviolet-stabilized acrylonitrile, having first and second major faces, a transparent adhesive bonding the first film to the first major face of the second film, and a transparent adhesive applied to the second major face of the second film adapted to bond the laminate to a photograph or other object to be laminated, the adhesive being selected from the group consisting of silicone adhesive and acrylic adhesive.

DEFINITIONS

The following definitions shall apply throughout the specification and claims of this application:

"Acrylonitrile" means an acrylonitrile homopolymer, such as "CLEARFOIL" polymer from Mobil Chemical Company, for example, or a copolymer, such as "BAREX 210" copolymer from Vistron, Inc., for example. "BAREX 210" is believed to be a copolymer of acrylonitrile and butadiene.

A photograph, document or other work of art has an "archival quality" when it has an expected life of at least 100 years without substantial deterioration in image quality.

A film or sheet is "highly moisture resistant" when it has a water vapor permeability of no greater than 1.5 g/mil/100 sq. in./24 hours as determined by test method ASTM E-96.

"Image surface" means the surface of a photograph containing the chemical emulsion which forms the image.

"Laminate" means at least two layers of material bonded together by heat, pressure and/or coextrusion of the layers.

"Polymer" means a macromolecule formed by the chemical union of 5 or more monomers which may be identical or dissimilar. Thus, "polymer" includes both true polymers and copolymers.

"Silicone adhesive" means an adhesive which is flexible, transparent and is a chemical combination of a silicone gum, the continuous phase having the general formula and structure

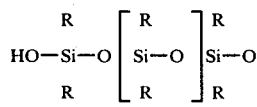

in which R is a lower alkyl group having carbon chains of from one to four carbon atoms, and a resin (condensed water glass reacted with trimethylchlorosilane).

A film or adhesive is "transparent" when it transmits at least 80% of the light in the visible wavelength range of 440 nm to 700 nm.

A film, sheet or adhesive is "ultraviolet-absorbing" when it filters at least 80% of ultraviolet radiation having a wavelength of about 320 nm to 380 nm.

A film, sheet or adhesive is "ultraviolet-stabilized" when it contains an ultraviolet stabilizing additive to retard degradation caused by ultraviolet radiation.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

FIG. 1 is a cross-section view of one embodiment of the present invention in which a release sheet is removably adhered to the laminate.

FIG. 2 is a cross-section view of the embodiment of the FIG. 1 after the release sheet has been removed and the laminate has been permanently bonded to a photograph.

FIG. 3 is a cross-section view of a second embodiment of the present invention in which a release sheet is removably adhered to the laminate.

FIG. 4 is a cross-section view of the embodiment of the FIG. 3 in which the release sheet has been removed and the laminate has been permanently bonded to a photograph.

FIG. 5 is a cross-section view of another embodiment of the present invention illustrating the application of the laminate of FIG. 1 to both major surfaces of a photograph.

FIG. 6 is a cross-section view of another embodiment of the present invention illustrating the application of the laminate of FIG. 3 to both major surfaces of a photograph.

DESCRIPTION OF THE PREFERRED EMBODIMENTS

Referring to the drawings in detail, wherein like numerals indicate like elements, there is shown in FIG. 1 an embodiment of the invention wherein laminate 17 comprises a film 30 bonded to a layer of adhesive 18. A release sheet 32 is removably adhered to the exposed surface of adhesive 18. The embodiment illustrated in FIG. 1 is used by peeling release sheet 32 from adhesive 18 and applying the combined structure of laminate 17 to a photograph.

FIG. 2 illustrates the adhesive bonding of the laminate 17 of FIG. 1 to a photograph 11. Photograph 11 is illustrated schematically as having a substrate 12 and an image layer 14. The substrate may be of any conventional type used in photographs, for example resin-coated paper, polymeric films, etc. The image layer 14 includes all of the dyes and other image forming chemicals used in photography. The surface of the image layer 14 comprises the image surface 16 upon which the laminate of the present invention is applied.

As pointed out hereinbefore, the laminates of the present invention have applications other than directly to photographic prints, such as to graphics, documents, and other like objects which are subject to gradual deterioration, particularly due to fading. However, the preferred application is to photographs.

FIG. 3 illustrates a second embodiment of the present invention wherein a fluorocarbon polymer or an ultraviolet-absorbing polymethylmethacrylate film 28 is adhesively bonded by a second layer of silicone or acrylic adhesive 26 to the laminate 17 illustrated in FIG. 1 to form a multilayer laminate 19. A release sheet 32 is removably adhered to the exposed surface of adhesive 18. The embodiment illustrated in FIG. 3 is used by peeling release sheet 32 from adhesive 18 and applying the combined structure of laminate 19 to a photograph. If a non-tacky adhesive is used, release sheet 32 is unecessary.

FIG. 4 illustrates the adhesive bonding of the laminate 19 of FIG. 3 to a photograph 11 having the previously described structure.

Adhesive 18 may be the same as adhesive 26. The characteristics required for the adhesive are that it be transparent and not be subject to significant deterioration by ultraviolet light, moisture, atmospheric pollution, oxidation or the temperatures associated with the normal indoor display and storage of photographs. The adhesive should be capable of firmly bonding the laminate to a photograph or other document.

The adhesive layers 18 and 26 each may be about 0.3 mil to about 2.0 mils thick. Preferably, each adhesive layer is 1 mil to 2 mils thick. Both or either may be silicone adhesives as defined in the "Definition" section of this application, or any of the well known transparent acrylic adhesives.

The silicone adhesives used with this invention may be activated by the application of combined heat and pressure, or by pressure alone. Suitable adhesives may be polysiloxanes or polyoxysiloxanes containing substituted lower alkyl groups having carbon chains from one to four carbon atoms. Although such adhesives are usually applied with a catalyst, it is presently preferred not to use a catalyst to enhance their peel strength at room temperature.

SILGRIP adhesive SR 6573, made by General Electric Company, is presently preferred for use in this invention. This adhesive is a heat sealable methyl-based silicone adhesive which is relatively tack-free when oven-dried without a catalyst. This adhesive resists the shear forces created in a laminate by different coefficients of thermal expansion of the components. The adhesive becomes aggressively pressure sensitive only when heated between 150° F. and 200° F. The residual carrier mixture for the adhesive is formulated to be non-photochemically reactive. It has a peel strength of 75 ounces-/inch when measured by ASTM D 1000. This adhesive is expected to have a longer life than any other transparent adhesive, yet it is not known to have ever previously been used as part of a laminate to protect photographs.

Another suitable type of adhesive is a transparent acrylic adhesive, which may be in the form of a solution, dispersion or liquid. Generally, acrylic adhesives are polymers and copolymers of acrylic and methacrylic acids and their derivatives, primarily the acrylic acid esters. Any of the commercially available transparent acrylic adhesives may be used in the laminate of this invention. An example of an effective acrylic adhesive is a copolymer of isooctyl acrylate and acrylic acid, dissolved in a mixture of heptane and isopropanol solvent. An ultraviolet absorber may be incorporated in the acrylic adhesive. Suitable ultraviolet absorbers and stabilizers are set forth hereinafter.

Film 30 is a transparent film selected from the group consisting of ultraviolet-stabilized polyethylene terephthalate or ultraviolet-stabilized acrylonitrile. Film 30 must be transparent, highly moisture resistant and be a barrier to oxidation and atmospheric pollution. Film 30 must also be relatively stiff in the major plane to give body to the laminate.

The thickness of film 30 may be from about 1 mil to about 6 mils. Preferably, the film is 1 mil to 3 mils thick.

The films and adhesives may be ultraviolet stabilized by the use of a standard ultraviolet stabilizer or absorber, such as benzophenones, benzotriazoles, substituted acrylates, aryl esters and hindered amines.

Benzophenones includes substituted 2-hydroxybenzophenones. They are available with a variety of substituents on the basic molecule to provide proper compatibility, non-volatility, and particular absorption properties. Typical examples are 2-hydroxy-4-methoxybenzophenone, 2-hydroxy,4-octyloxybenzophenone, 4-dodecyloxy-2-hydroxybenzophenone, and 2,2'-dihydroxy-4,4'-dimethoxybenzophenone.

The benzotriazoles comprise derivatives of 2-(2'-hydroxyphenyl)benzotriazole. Typical examples are 2-(2'-hydroxy-5'-methylphenyl)benzotriazole and 2-(2'-hydroxy-5'-t-octylphenyl) benzotriazole.

Another art recognized class of ultraviolet absorbers is substituted acrylates, including for example, ethyl-2-cyano-3,3'diphenyl acrylate, 2-ethylhexyl-2-cyano-3,3,diphenyl acrylate, and p-methoxy-benzylidenemalonic acid dimethyl ester.

Additionally, aryl esters form another art recognized class of ultraviolet absorbers. This class includes aryl salicylates, benzoates, and esters of resorcinol. Typical examples are phenyl salicylate, p-t-octylphenyl salicylate, resorcinol monobenzoate, and 2-4,di-t-butylphenyl-3,5-di-t-butyl-4-hydroxybenzoate.

Hindered amines such as the tetramethyl piperidine derivatives, constitute another class of ultraviolet stabilizers. These are not conventional ultraviolet absorbers but instead function as energy quenchers, peroxide decomposers, and/or alkyl radial terminators to retard degradation by ultraviolet radiation of the substrate or other material to which they are applied.

These ultraviolet stabilizers or absorbers may be used by being incorporated into the polymer forming the acrylic adhesive or the polymer forming the film in an amount no more than 2% by weight, typically from about 0.5% to 2% by weight. It is presently preferred to incorporate 1% by weight of the ultraviolet stabilizer into the polymer. Additionally, the ultraviolet stabilizers or absorbers may be impregnated into the adhesive after mixing or impregnated into the film after the film is extruded or otherwise formed.

The embodiments of the laminate of the present invention illustrated in FIGS. 3 and 4 include a fluorocarbon or ultraviolet-absorbing polymethylmethacrylate film 28 as the surface layer. The presently preferred material for sheet or film 28 is ultraviolet-absorbing polymethylmethacrylate.

A major advantage of using polymethylmethacrylate film as the surface layer is that it can be texturized at pressures and temperatures which will not damage the photograph or other document to which the laminate is applied. Texturizing the surface of the polymethylmethacrylate film reduces glare and provides an attractive, linen or matte display without altering the photograph or other document. Various textures can be used, from fine matte to coarse canvas if desired. The user has a choice of surface finishes ranging from glossy to any number of several textures. The use of texturizable polymethylmethacrylate as a laminating film for photographic elements is a novel use of polymethylmethacrylate.

The use of a fluorocarbon film to add protection to photographic elements is a novel use of fluorocarbon films. It is essential that the surface layer film be transparent, highly moisture resistant, and effective as a superior barrier to atmospheric pollution and oxidation. Moreover, the surface layer film is not affected by ultraviolet radiation.

Suitable fluorocarbons that can be used for film 28 include polychlorotrifluoroethylene, fluorinated ethylene propylene and ethylene tetrafluoroethylene. Most other types of fluorocarbon film are not sufficiently transparent for this application.

The presently preferred fluorocarbon film is a polychlorotrifluoroethylene film made under the trademark ACLAR by Allied Chemical Corp. Preferably, the polychlorotrifluoroethylene or other fluorocarbon film should be treated to enhance receptiveness to adhesives, such as by corona discharge or alkali etching.

Laminate 19 illustrated in FIGS. 3 and 4 is made by bonding the first major face 22 of film 30 to the film 28 by a silicone or acrylic adhesive 26.

In the embodiment illustrated in FIG. 4, laminate 19 is adhesively bonded to the photograph. This is done by providing a layer of adhesive 18 adjacent the second major face 24 of film 30. The adhesive 18 thereby bonds the laminate to the image surface 16 of the photograph. If the adhesive selected is heat-sealable, rather than pressure sensitive, the temperature used to bond the laminate to the photograph should be no greater than about 210° F. and the heat should be applied for no longer than about 3 minutes to avoid blistering of the image layer or otherwise damaging the substrate of the photograph.

FIGS. 5 and 6 illustrate two additional embodiments of the present invention in which the laminate of the present invention is bonded to both sides of a photograph 11.

In FIG. 5, laminate 17 is bonded by adhesive 18 to the image surface 16 of photograph 11. Laminate 117 comprises layers 118 and 130 which correspond to layers 18 and 30 of laminate 17. Adhesive 118 corresponds to adhesive 18. Laminate 117 is bonded by adhesive 118 to the substrate 12 of photograph 11. This is done to provide even greater protection against degradation of the photograph and to resist the potential of the photograph to curl when a laminate is applied only to the image surface.

FIG. 6 illustrates the application of the laminate described with respect to FIGS. 3 and 4 to both sides of a photograph for the same reasons as set forth above concerning FIG. 5. Laminate 19 is bonded by adhesive 18 to image surface 16 of photograph 11. Laminate 119, corresponding to laminate 19, is bonded to substrate 12 of photograph 11 by adhesive 118.

It is contemplated that the present invention may be packaged and sold as discrete laminates for application to individual photographs, in roll form to be applied to a series of photographs seriatim or otherwise for separate application to photographs or the like.

The present invention may be embodied in other specific forms without departing from the spirit or essential attributes thereof and, accordingly, reference should be made to the appended claims, rather than to the specification, as indicating the scope of the invention.

I claim:

1. A laminate to protect photographs from deterioration comprising a first transparent film selected from the group consisting of fluorocarbon polymer and ultraviolet-absorbing polymethylmethacrylate, a second film selected from the group consisting of ultraviolet-stabilized polyethylene terephthalate or ultraviolet-stabilized acrylonitrile, having first and second major faces, a transparent adhesive bonding the first film to the first major face of the second film, and a transparent adhesive applied to the second major face of the second film adapted to bond the laminate to the photograph, the adhesive being selected from the group consisting of silicone adhesive and acrylic adhesive, the laminate being effective to absorb ultraviolet radiation.

2. A laminate according to claim 1 wherein the adhesive is an acrylic adhesive.

3. A laminate according to claim 1 wherein the adhesive is a silicone adhesive.

4. A laminate according to claim 1 wherein the fluorocarbon polymer is selected from the group consisting of polychlorotrifluoroethylene, fluorinated ethylene propylene and ethylene-tetrafluoroethylene.

5. A laminate according to claim 1 wherein the fluorocarbon polymer is polychlorotrifluoroethylene.

6. A laminate according to claim 1 wherein each of the first and second films is about 1 mil to about 6 mils thick and the adhesive is about 0.3 mil to about 2.0 mils thick.

7. A laminate according to claim 1 wherein the first film is ultraviolet-absorbing polymethylmethacrylate.

8. A laminate according to claim 7 wherein the adhesive is an acrylic adhesive.

9. A laminate according to claim 7 wherein the adhesive is a silicone adhesive.

10. A laminate according to claim 7 wherein the polymethylmethacrylate film has a textured outer surface.

11. A laminate according to claim 1 wherein each of the first and second films is 1 mil to 3 mils thick and the adhesive is 1 mil to 2 mils thick.

12. A laminate according to any one of claims 1 through 11 further comprising a release sheet removably adhered to the exposed surface of the adhesive bonded to the second major face of the second film.

13. A laminated photograph in which the laminate according to any one of claims 1 through 11 is bonded to the image surface of the photograph by the adhesive bonded to the second major face of the second film and the image surface of the photograph.

14. A laminated photograph in which one laminate according to any one of claims 1 through 11 is bonded to the image surface of the photograph by the adhesive bonded to the second major face of the second film and the image surface of the photograph, and another laminate according to any one of claims 1 through 11 is bonded to the substrate of the photograph by the adhesive bonded to the second major face of the second film and the substrate of the photograph.

15. A laminate to protect a photograph from deterioration comprising a transparent film selected from the group consisting of ultraviolet-stabilized polyethylene terephthalate and ultraviolet-stabilized acrylonitrile, and a layer of transparent adhesive bonded to the film, the adhesive being selected from the group consisting of silicone adhesive and acrylic adhesive, the laminate being adapted to be bonded to the image surface of a photograph by the adhesive, the laminate being effective to absorb ultraviolet radiation.

16. A laminate according to claim 15 wherein the film is about 1 mil to about 6 mils thick and the adhesive is about 0.3 mils to about 2.0 mils thick.

17. A laminate according to claim 15 wherein the film is 1 mil to 3 mils thick and the adhesive is 1 mil to 2 mils thick.

18. A laminate according to any one of claims 15 through 17 further comprising a release sheet removably adhered to the exposed surface of the adhesive of the laminate.

19. A laminated photograph in which the laminate according to any one of claims 15 through 17 is bonded to the image surface of the photograph.

20. A laminated photograph in which one laminate according to any one of claims 15 through 17 is bonded to the image surface of the photograph and another laminate according to any one of claims 15 through 17 is bonded to the substrate of the photograph.

* * * * *